United States Patent [19]
Werling et al.

[11] 4,254,741
[45] Mar. 10, 1981

[54] DIESEL ENGINE WITH DUAL FUEL INJECTION SYSTEM AND METHOD OF OPERATION

[75] Inventors: Craig L. Werling; Donald I. Townsend, both of Midland, Mich.

[73] Assignee: The Dow Chemical Company, Midland, Mich.

[21] Appl. No.: 960,254

[22] Filed: Nov. 13, 1978

Related U.S. Application Data

[62] Division of Ser. No. 863,820, Dec. 23, 1977, abandoned.

[51] Int. Cl.³ .......................... F02B 3/08; F02B 75/12
[52] U.S. Cl. .................................... 123/1 A; 123/258; 123/267
[58] Field of Search .............. 123/32 C, 32 G, 32 ST, 123/33 D, 127, 121, 75 B, 191 R, 27 GE, 32 D, 1 A, 32 R, 32 F

[56] References Cited

U.S. PATENT DOCUMENTS

| | | | |
|---|---|---|---|
| 1,156,846 | 10/1915 | Johnson | 123/32 R |
| 1,554,877 | 9/1925 | Niefer | 123/32 R |
| 1,753,253 | 4/1930 | Tacchella | 123/33 D |
| 2,862,481 | 12/1958 | Rounds et al. | 123/1 A |
| 3,125,077 | 3/1964 | Monnot et al. | 123/32 D |
| 3,895,618 | 7/1975 | Cerf | 123/32 ST |
| 3,924,598 | 12/1975 | Davis | 123/32 ST |
| 3,990,413 | 11/1976 | Pischinger | 123/32 ST |
| 4,014,301 | 3/1977 | Happel | 123/32 ST |
| 4,019,477 | 4/1977 | Overton | 123/127 |
| 4,031,864 | 6/1977 | Crothers | 123/127 |

FOREIGN PATENT DOCUMENTS 934669  5/1948  France .................................. 123/127

*Primary Examiner*—P. S. Lall
*Attorney, Agent, or Firm*—V. Dean Clausen

[57] ABSTRACT

The diesel engine of this invention is designed to operate on more than one fuel composition. The auto ignition temperature of each fuel composition can be the same, or it can be different. As a typical example, the engine can be operated using diesel fuel oil, as the primary fuel, and a chlorinated hydrocarbon waste liquid, as the secondary fuel. The waste liquid, which has a higher auto ignition temperature than the diesel fuel, is injected into the combustion chamber of the engine an instant before injection of the diesel fuel. Because of its lower auto ignition temperature, the diesel fuel will ignite first and thus provide a "spark" for igniting the secondary fuel.

2 Claims, 2 Drawing Figures

DIESEL ENGINE WITH DUAL FUEL INJECTION SYSTEM AND METHOD OF OPERATION

This is a divisional of application Ser. No. 863,820 filed Dec. 23, 1977 and now abandoned.

BACKGROUND OF THE INVENTION

Broadly, the invention relates to a diesel engine having a dual injection system for the engine fuel. More specifically, the engine of this invention is designed to operate on a fuel mixture having one or more chemical compositions. The auto ignition temperature of each composition may be the same or different.

Diesel engines are usually designed to operate on an oil-type fuel, such as diesel fuel oil, which is a petroleum distillate. Some diesel engines, however, are arranged to operate on a mixture of gas and oil, such as natural gas and diesel fuel oil. These engines are usually called natural gas diesels, or dual-fuel diesels, and they can be either two- or four-stroke cycle engines. In the normal operation of the diesel which utilizes an oil-type fuel, atmospheric air is first compressed in the cylinder (combustion chamber) to a pressure of about 500 psi. Compression of the air raises its temperature to about 1000° F. The fuel oil is then injected into the compressed, hot air through a fuel injection nozzle, which atomizes the oil. The atomized oil and air mixture rises to its auto ignition temperature, thus causing the fuel to spontaneously ignite, burn and expand. As the burned gas expands it drives the piston downwardly to initiate the power stroke of the engine.

In the normal operation of a natural gas diesel, a mixture of natural gas and air is drawn into the combustion chamber through the intake valve. In the same manner as the oil-burning engine, the combustible mixture is compressed by the rising piston to raise the temperature of the gaseous fuel. Toward the end of the compression stroke a small amount of diesel fuel oil is injected into the combustion chamber, and the resulting mixture ignites, burns and expands. These diesels normally operate at a lower compression ratio than the oil-burning engines.

In both types of the diesel engines described above, the timing of the engine cycle is directly related to the auto ignition temperature of the fuel. Since the fuel composition is a homogeneous mixture of fuel oil and air, the engine can be adjusted for proper timing, using well known techniques. However, once the engine is properly timed, that is, by adjusting the fuel injection timing, a change in the composition of the fuel oil may require re-timing of the engine. For example, any time that a change in the fuel oil composition results in a significant change in the auto ignition temperature of the composition, the injection timing must be changed to accomodate the new fuel. If the fuel injection timing is not changed to correspond with the change in the auto ignition temperature, the fuel being injected into the combustion chamber will either ignite prematurely, or too late. The overall result is very poor combustion of the fuel and inefficient engine operation.

The diesel engine of this invention is not subject to the fuel ignition problem mentioned above. The present engine is equipped with a novel injection system which permits two fuels, each having the same, or a different auto ignition temperature, to be injected into the combustion chamber separately. In the injection sequence the primary fuel is first pumped into a pre-combustion chamber in the engine cylinder head. The primary fuel thus ignites first and produces a flame front for igniting a secondary fuel composition, which is pumped directly into the combustion chamber.

SUMMARY OF THE INVENTION

The invention embodies a diesel engine having a dual fuel injection system and a method for operating the engine. Basic components of the engine include an engine block with a cylinder therein, a cylinder head mounted on the engine block, a piston slidable in the cylinder, and a crankshaft mounted in the engine block. The space between the piston and the cylinder head defines a main combustion chamber. On one side of the cylinder head is a pre-combustion chamber. The upper end of the pre-combustion chamber communicates with a means for injecting fuel into the chamber. The lower end of the pre-combustion chamber is in direct communication with the main combustion chamber of the engine.

A second fuel injection means, which is mounted on the cylinder head, communicates directly with the main combustion chamber. Fuel is delivered to the second fuel injection means by a fuel pump connected into this injection means. This fuel pump is operated by a timing mechanism according to a sequence which causes the fuel to be injected into the second injection means and directly into the main combustion chamber on the compression stroke of the engine. One embodiment of a suitable timing mechanism is provided by a driver gear mounted on one end of the engine crankshaft, which engages a driven gear mounted on one end of the camshaft. As the camshaft is rotated by the crankshaft, a lobe on the camshaft actuates a mechanism on the fuel pump which allows the pump to inject the fuel according to the sequence described above.

The engine described herein is designed to operate on one or more fuel compositions. The auto ignition temperature of each fuel composition can be the same, or it can be different. In a typical operation, a hydrocarbon diesel fuel oil is injected into the pre-combustion chamber, through the first fuel injection means, on the compression stroke of the engine. An instant later in the compression stroke, a second fuel, which has a lower auto ignition temperature than the diesel fuel oil, is injected directly into the main combustion chamber through the second fuel injection means. In this sequence the diesel fuel will ignite first and provide the "spark" needed for igniting the second fuel composition, as it enters the main combustion chamber. If the second fuel composition has a higher auto ignition temperature than the diesel fuel oil, it is injected at the same time, or just prior to, injection of the diesel fuel oil.

DESCRIPTION OF THE PREFERRED EMBODIMENT

Figure 1:
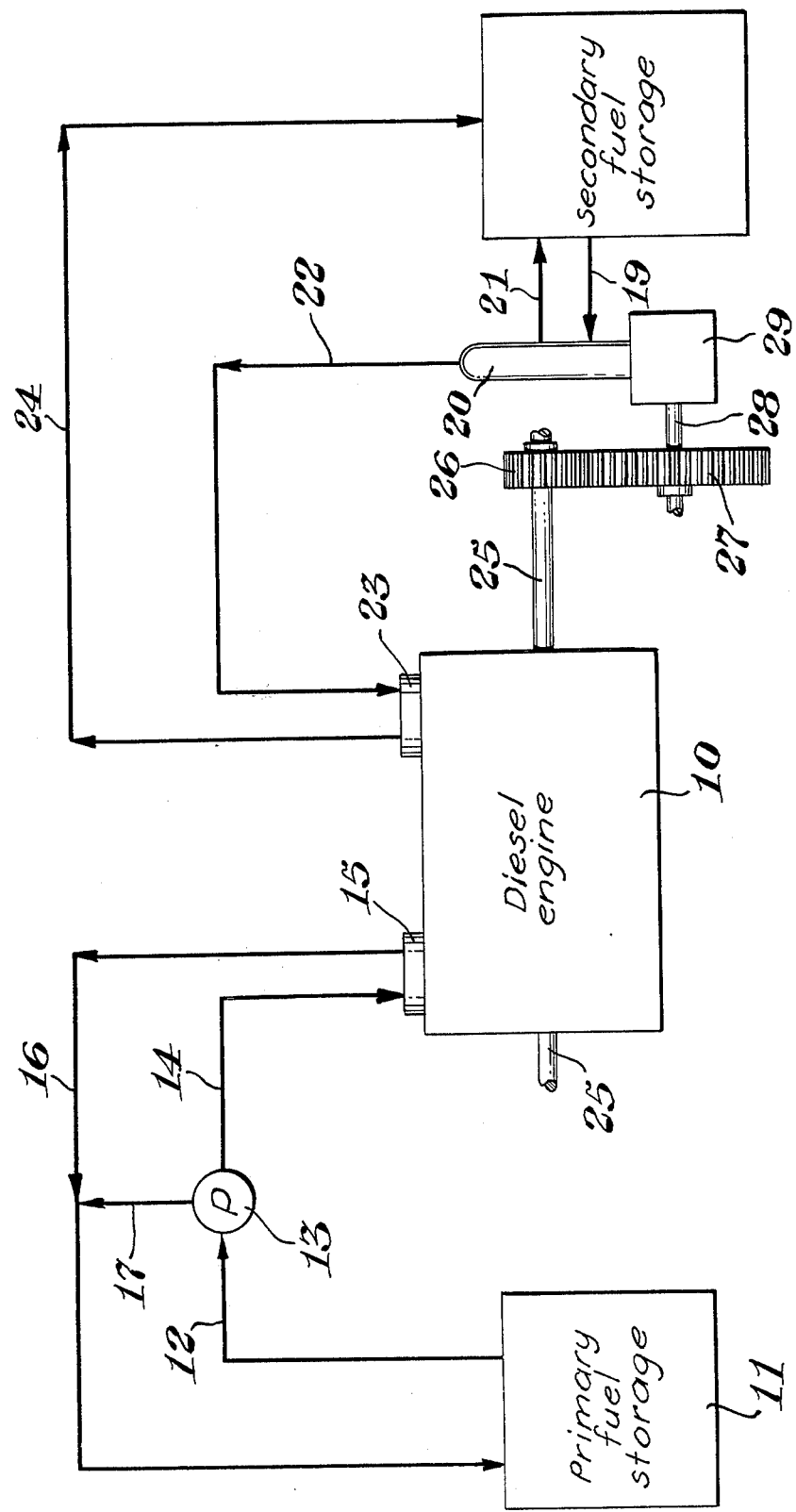
FIG. 1 is a schematic illustration of a diesel engine and related components according to one embodiment of this invention.

Referring particularly to FIG. 1 of the drawing, the numeral 10 refers to a diesel engine. A vessel 11 provides means for storing a liquid phase hydrocarbon fuel, such as diesel fuel oil. A line 12 connects the vessel 11 into the inlet side of a fuel pump 13. From the outlet side, fuel pump 13 is connected by a line 14 into a fuel injection nozzle 15, which is mounted on the engine 10. During injection of fuel into the engine, some of the fuel represents excess which the injection nozzle 15 returns to the storage vessel 11. A fuel return line 16 provides means for sending the excess fuel back to the storage vessel. The fuel pump 13 also has a fuel return line 17 which connects into the return line 16.

Another vessel 18 provides means for storing another liquid phase fuel, such as a halogenated organic compound. A line 19 connects the vessel 18 into the inlet side of a second fuel pump 20. The fuel pump 20 is also equipped with a fuel return line 21, which connects into the vessel 18. From vessel 18 fuel is pumped into the diesel engine 10 through a line 22, which connects fuel pump 20 into a second injection nozzle 23, which is mounted on the engine. Nozzle 23 also has a fuel return line 24, which connects directly into the vessel 18.

The crankshaft of engine 10 is indicated by numeral 25. A driver gear 26 is mounted on one end of the crankshaft. The opposite end of the crankshaft 25, shown to the left of the engine 10 in FIG. 1, represents the power output of the engine. The driver gear 26 engages a driven gear 27, which is mounted at one end of a camshaft 28. On the opposite end of camshaft 28 is a single lobe which engages a lever mechanism on fuel pump 20, to operate the pump. The lobe end of camshaft 28 and the lever mechanism of fuel pump 20 are enclosed within a housing 29, so that these components are not illustrated in FIG. 1.

Figure 2:
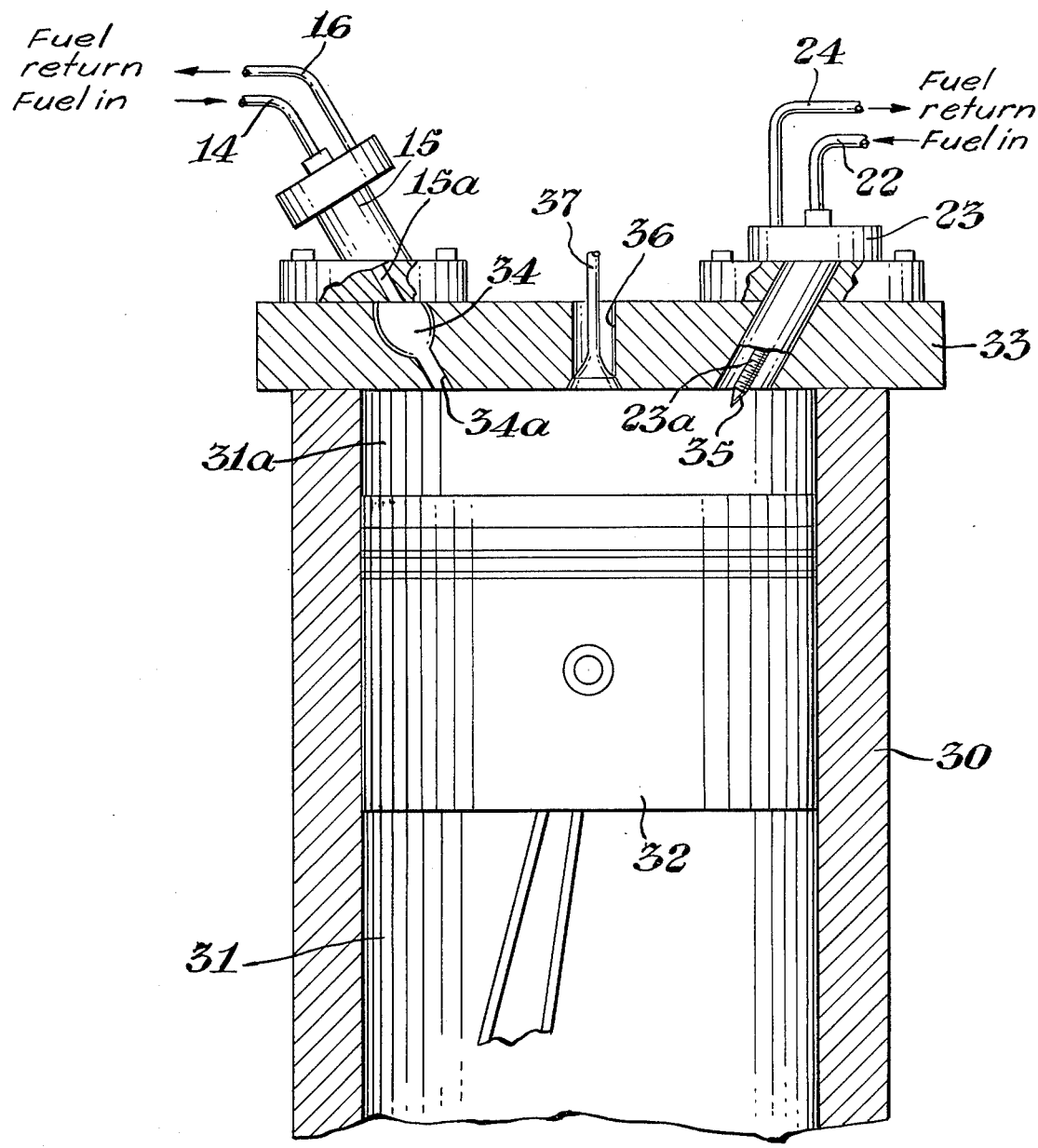
FIG. 2 is a detail view, mostly in section, illustrating, the combustion chamber and fuel injection system of the diesel engine shown in FIG. 1.

In the detail view of FIG. 2 the engine block of diesel engine 10 is indicated by numeral 30. A cylinder 31 is defined in the engine block. Inside this cylinder is a slidable piston 32. The top of the engine cylinder 31 is defined by a cylinder head 33. Within the cylinder 31 the space between the top of piston 32 and cylinder head 33 is referred to as the main combustion chamber, as indicated by numeral 31a.

As shown in FIG. 2, a pre-combustion chamber 34 is defined within the cylinder head. A central bore 15a in injection nozzle 15 communicates with the upper part of the pre-combustion chamber 34. The lower part of the pre-combustion chamber 34 is defined by central bore 34a, which communicates with the main combustion chamber 31a. A secondary fuel injection nozzle 23 is mounted on the cylinder head 33. Nozzle 23 includes a lengthwise bore 23a. The lower end of the nozzle bore extends into the main combustion chamber 31a at a point spaced from the pre-combustion chamber. A spray nozzle 35 is threaded into the lower end of the nozzle bore 23a. The spray nozzle 35 provides a means for injecting fuel in a spray pattern into the main combustion chamber.

The cylinder head 33 also includes an intake port 36, which is shown in FIG. 2 as being located between the injection nozzles 15 and 23. In the practice of this invention the intake port can be positioned at other locations in the cylinder head. An intake valve 37 is seated in the intake port. In the cylinder head 33, and adjacent to the intake port 36, is an exhaust port with an exhaust valve seated therein. To simplify the drawing the exhaust port and its exhaust valve are not shown herein.

The invention can be illustrated by describing a typical operation of the diesel engine 10. In actual practice the engine is usually operated on two liquid fuels. For the purpose of this description one fuel will be referred to as the primary fuel, and the other as the secondary fuel. In this invention the primary fuel can be characterized as a liquid fuel which provides the "spark" needed to ignite and burn the fuel mixture in the combustion chamber. In general, the primary fuel can be any liquid fuel which is capable of igniting and burning at the normal operating temperature of a diesel engine, that is, at approximately 1000° F.

For the primary fuel, it is preferred to use a liquid hydrocarbon composition. It is especially preferred to use conventional diesel fuel oils, which are composed chiefly of aliphatic hydrocarbons. The commercially available diesel fuel oils are usually designated in three grades: No. 1-D, No. 2-D, and No. 3-D fuel oil. Material specifications for these diesel fuels are listed in a standard engineering reference entitled "Handbook of Engineering Fundamentals", Third Edition, O. W. Eshbach et al. (John Wiley & Sons) Table 143, page 1498.

As a general characteristic, the secondary fuel can be any liquid composition which is capable of being ignited by the flame front produced in the combustion chamber by the primary fuel. Typical of secondary fuels which can be burned in the engine of this invention are liquid hydrocarbon waste products. Examples of liquid waste hydrocarbons which may be used are the halogen derivatives of aliphatic hydrocarbons, alicyclic hydrocarbons, and aromatic hydrocarbons. This particular group includes chlorinated hydrocarbons, such as carbon tetrachloride, propylene dichloride, tetrachloroethane, mono- and dichlorobenzene, tetrachlorophenol, bromobenzene, and the like.

In an actual example of an engine run, the primary fuel used was No. 2-D diesel fuel oil. The secondary fuel was a mixture containing about 95 percent propylene dichloride and 5 percent No. 2-D diesel fuel. The engine 10 was first brought up to a suitable operating temperature, burning only No. 2-D diesel fuel oil. Diesel fuel oil was then injected into the main combustion chamber 31a through the primary injection nozzle 15 and the engine was allowed to run for a short period.

After the engine had reached normal operating temperature, injection of the No. 2-D diesel fuel oil through the primary nozzle 15 was allowed to continue. At this time the injection of the secondary fuel, through the secondary injection nozzle 23, was commenced. In the actual operating cycle of the engine, atmospheric air is first drawn into the main combustion chamber 31a through the port 36, on the intake stroke of the engine. At this point the piston 32 is at 0 degrees, or top dead center of the cylinder. When the piston reaches 90 degrees on the intake stroke, which is bottom dead center of the cylinder, valve 37 closes and the piston rises on the compression stroke. The air in the cylinder is compressed to about 500 psi and its temperature is raised to about 1000° F.

On each compression stroke, at about 168 degrees (12 degrees before top dead center), the diesel oil primary fuel was injected into the pre-combustion chamber 34 through nozzle 15. At about 165 degrees in the compression stroke (15 degrees before top dead center), the secondary fuel, comprising propylene dichloride and diesel fuel oil, was injected into the main combustion chamber 31a through the injection nozzle 23 and spray nozzle 35. At about 178 degrees in the compression stroke, the diesel fuel oil will ignite in the pre-combustion chamber, and the resulting flame front will propagate into the main combustion chamber.

The moving flaming front thus ignites the secondary fuel and causes the entire mixture in the main combustion chamber to burn and expand. This initiates the power stroke of the engine. When the piston reaches bottom dead center on the power stroke, which is at 270 degrees, the exhaust valve (not shown) opens. As the piston rises on the exhaust stroke the burned gases are forced into an exhaust header (not shown). When the piston reaches top dead center on the exhaust stroke, that is, at 360 degrees, the four-stroke cycle is completed.

After the engine had been in continuous operation for about one hour a sample of the exhaust gas was collected. Using a known analytical procedure the gas sample was analyzed for the presence of propylene dichloride. Prior to oxidation in the combustion chamber of engine 10, the propylene dichloride represented about 9 percent of the total combustible mixture, which included air. The exhaust gas sample was found to contain about 870 ppm propylene dichloride. This indicated that at least 90 percent of the propylene dichloride was destroyed in the combustion reaction.

According to the practice of this invention the auto ignition temperature of a fuel composition can be generally defined as that temperature at which the vapor phase of the fuel will ignite. In the example described above, the secondary fuel has a somewhat higher auto ignition temperature than the diesel oil or primary fuel. This means that the primary fuel will ignite at a lower temperature than the secondary fuel. Because of this property the secondary fuel is injected into the main combustion chamber of the engine at about the same time, or slightly before, injection of the primary fuel. By injecting the fuels in this sequence the primary fuel starts burning first, and thus provides the "spark" required to ignite the secondary fuel.

In those situations where the temperature required to ignite the primary fuel is higher than that required to ignite the secondary fuel, the secondary fuel is injected into the combustion chamber of the engine an instant later than the primary fuel. As a general rule for the practice of this invention, the primary fuel can be injected at a position between about 150 degrees and 175 degrees in the compression stroke. For the secondary fuel, the injection should take place somewhere between 160 degrees and 185 degrees, that is, from about 20 degrees before top dead center on the compression stroke, to about 5 degrees after top dead center on the power stroke.

The mechanism which permits the secondary fuel to be injected at the proper time in the engine cycle will now be explained. For this explanation, assume that the diesel engine to be operated is a four-stroke cycle engine. On this engine the governor for the primary fuel system regulates fuel flow through the primary injection nozzle 15, such that the engine speed is maintained constant at 1800 rpm. The driver gear 26, which is mounted on crankshaft 25, is a gear which has 60 teeth. During engine operation the driver gear thus turns at a constant speed of 1800 rpm.

The driven gear 27, which is mounted on camshaft 28, has 120 teeth. The engagement of gear 26 with gear 27 thus causes the camshaft 28 to rotate at one-half the speed of crankshaft 25, or 900 rpm. As the camshaft 28 turns, a single lobe on the camshaft operates a lever mechanism on the fuel pump 20. The operation of this lever mechanism causes the pump 20 to inject the secondary fuel into the main combustion chamber through the injection nozzle 23 on each compression stroke of the engine.

What is claimed is:

1. A method for operating a diesel engine on a fuel mixture containing more than one fuel composition, the method comprising:
   injecting a hydrocarbon diesel fuel oil into the pre-combustion chamber of a diesel engine on the compression stroke of the engine;
   injecting a second liquid fuel into the combustion chamber of the engine an instant before injection of the hydrocarbon diesel fuel oil, on the compression stroke of the engine, the second liquid fuel having a higher auto ignition temperature than the diesel fuel oil, and the second liquid fuel being a member of the group consisting of halogenated aliphatic hydrocarbons, alicyclic hydrocarbons, aromatic hydrocarbons, and mixtures thereof;
   first causing the hydrocarbon diesel fuel oil to ignite and burn in the pre-combustion chamber of the engine; and
   immediately thereafter causing the second liquid fuel to ignite and burn in the combustion chamber of the engine.

2. The method of claim 1 in which the liquid phase halogenated hydrocarbon is a member of the group consisting of chlorinated derivatives of aliphatic hydrocarbons.

* * * * *